United States Patent
Lässle et al.

(10) Patent No.: US 6,472,998 B1
(45) Date of Patent: Oct. 29, 2002

(54) RECEIVER OF A REMOTE CONTROL SYSTEM AND A METHOD FOR OPERATING A REMOTE CONTROL SYSTEM

(75) Inventors: Hans-Peter Lässle, Usingen; Dietmar Schmid, Villmar, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/232,036

(22) Filed: Jan. 15, 1999

(30) Foreign Application Priority Data

Jan. 20, 1998 (DE) .......................... 198 01 885

(51) Int. Cl.$^7$ ..................... G08C 19/00; G08C 19/12; H04B 1/18; H04B 1/16; H03K 17/94
(52) U.S. Cl. ..................... 340/825.69; 340/825.72; 455/151.2; 455/34.3; 341/176; 341/23
(58) Field of Search ................. 340/426, 428, 340/528, 664, 825.69, 636, 825.72; 307/10.2; 455/151.2, 343; 341/176, 23; 318/16, 103

(56) References Cited

U.S. PATENT DOCUMENTS

| | | | |
|---|---|---|---|
| 4,763,121 A | * | 8/1988 | Tomoda et al. ........ 340/825.54 |
| 5,420,568 A | | 5/1995 | Iida et al. |
| 5,650,774 A | * | 7/1997 | Drori ..................... 340/825.32 |
| 5,717,387 A | * | 2/1998 | Suman et al. .......... 340/825.31 |
| 5,723,911 A | * | 3/1998 | Glehr ...................... 307/10.2 |
| 6,091,341 A | * | 7/2000 | Nose et al. ............. 340/825.32 |

FOREIGN PATENT DOCUMENTS

DE    3341900    5/1985
EP    0496024    7/1992

* cited by examiner

Primary Examiner—Michael Horabik
Assistant Examiner—Nam Nguyen
(74) Attorney, Agent, or Firm—Martin A. Farber

(57) ABSTRACT

An improved receiver (5) of a remote control system, in particular for closing systems of a motor vehicle, and a method for operating such a remote control system are proposed.

Modern motor vehicle closing systems are equipped with remote control systems which, in addition to the central locking of the doors, also perform so-called comfort functions such as the closing of the windows or of the sunroof. For safety reasons, such a comfort function must be terminated as soon as a signal fails to be received. If the remote control system is activated at the limit of its range, the response threshold of the receiver (5) may be undershot as a result of the transmitter (1) moving. This leads to undesired breaking off of the comfort function, or to jerky operation of the comfort function. According to the invention, it is therefore proposed to implement the response threshold of the receiver so that it is capable of being switched over. By virtue of the response threshold which is relatively high in the position of rest (status A) of the receiver, the remote control has a smaller range. After the detection of a signal, the comfort function is activated (status B) and the response threshold lowered (status C), so that the sensitivity and the range of the remote control system are then increased.

The response threshold can be switched over, for example, by means of an attenuator (9).

9 Claims, 2 Drawing Sheets

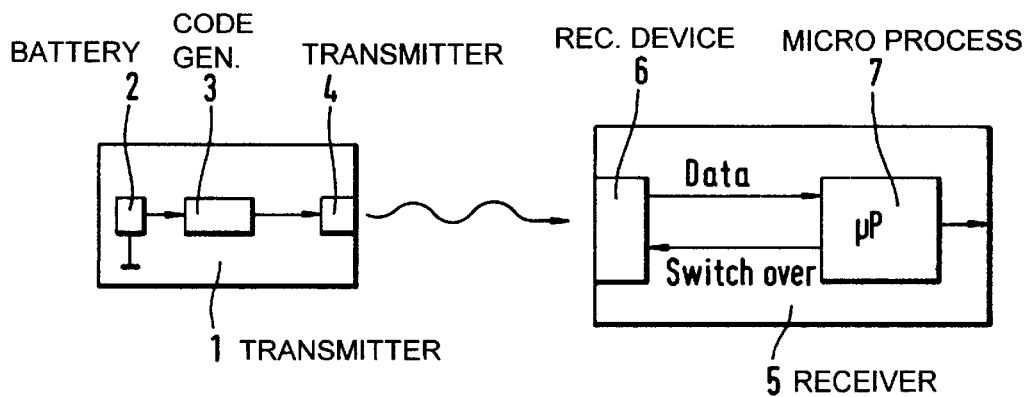
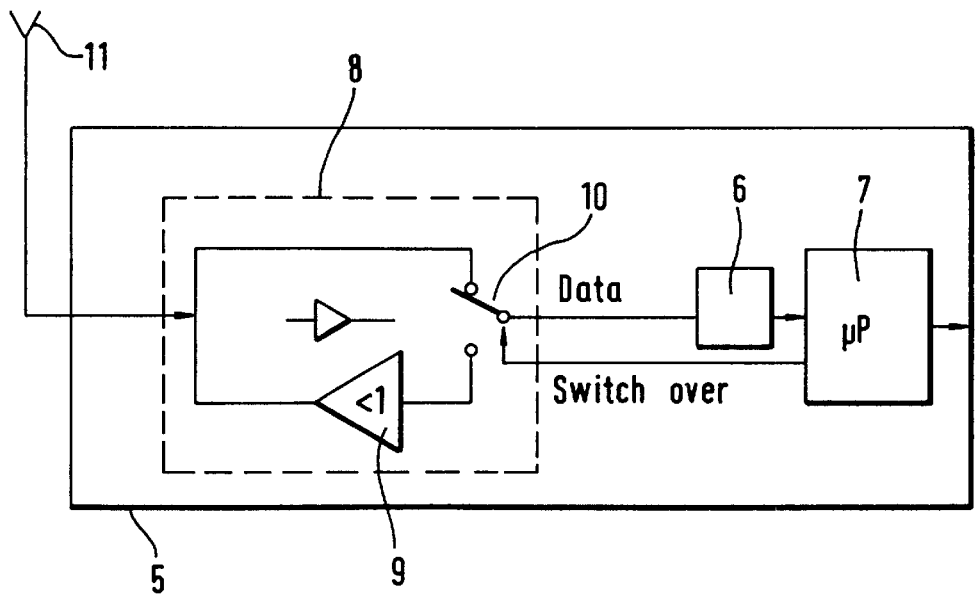

RECEIVER OF A REMOTE CONTROL SYSTEM AND A METHOD FOR OPERATING A REMOTE CONTROL SYSTEM

FIELD AND BACKGROUND OF THE INVENTION

The invention relates to a receiver of a remote control system, in particular for the closing system of a motor vehicle, which is designed to receive signals of an associated transmitter (1), and drives one or more actuators when signal levels above its response threshold are present, and to a method for operating a remote control system.

DE-A 33 41 900 discloses a remote control system for locking and unlocking security systems in vehicles. The remote control system comprises a receiver unit, which is accommodated in the vehicle, and a signal transmitter with its own power supply. By activating the signal transmitter, coded signals are transmitted by it in the direction of the receiver unit. The receiver unit receives the signals, compares them with a stored pattern, and activates a security system when the signal patterns correspond. According to DE-A 33 41 900, the signals which are generated by the signal transmitter are transmitted with variable transmission energy. By increasing the transmission energy as the activation time becomes longer, it is possible, on the one hand, to ensure that the security system is activated with the smallest possible amount of transmission energy for the given distance between the vehicle and transmitter, in order to make it more difficult for third parties to intercept the transmission signal. At the same time, it is advantageous to place as little load as possible on the battery. On the other hand, the transmission power which increases as the activation time of the transmitter becomes longer is intended to ensure that the remote control system still functions even under difficult reception conditions, such windows coated with ice, for example.

In modern closing systems with a remote control system, the transmitter is as a rule accommodated in the vehicle key. The receiver usually includes an intelligent electronic system which is capable of driving a plurality of actuators. Such a receiver monitors, controls and adjusts a wide variety of functions such as the central locking of the doors, the anti-theft alarm system, the interior lights, the window lifting devices and the sunroof. In particular in the case of the comfort functions of the closing of the windows and of the sunroof it is indispensable for safety reasons (for example nip guard) that the function should be carried out only for as long as an input signal is applied to the receiver. However, the receiver cannot detect for what reasons there are no longer any signals present. This may be desired by the operator, but it may also occur owing to an excessively low signal level. The latter occurs, for example, if the operator moves too far away from the reception device or if the function is triggered at the limit of the range, and the field strength at the receiver drops below the response threshold as a result of the transmitter moving. This leads to the initiated function (for example closing of the windows) being interrupted or entirely broken off.

SUMMARY OF THE INVENTION

The invention, has an objective to specify a receiver and a method which make it possible to remedy the aforesaid deficiencies.

In the receiver according to the invention, this is achieved by means for changing the response threshold of the receiver.

According to the method in accordance with the invention, the following method steps are provided:
reduction of the response threshold of the receiver after a signal of the transmitter is detected, and
increasing the response threshold of the receiver after a signal fails to occur.

The receiver and/or the method according to the invention ensure that a comfort function, such as the closing of the windows or of the sunroof, is maintained even if the signal level is reduced as a result of the transmitter moving or as a result of the distance between the transmitter and receiver increasing. A jerky or uneven operation as a result of dropping signal levels is largely ruled out, since decreasing signal levels are compensated over a wide range by virtue of a reduced response threshold of the receiver.

The changing of the response threshold of the receiver can be effected in the form of switching over by means of an attenuator or amplification element which can be varied by means of a control signal. In accordance with a further embodiment, in order to change the response threshold, a comparator is provided for comparing the level of the received signal with a setpoint value. The control signal for the attenuator or amplification element, and/or the setpoint value for the comparator, are expediently made available by a microprocessor contained in the receiver. The receiver may be, in particular, a radio receiver or an infrared receiver.

BRIEF DESCRIPTION OF THE DRAWINGS

The invention is explained in more detail below with reference to the figures, of which:

FIG. 3 is a basic illustration of a remote control system in a motor vehicle, FIG. 4 shows an embodiment of the receiver with attenuator for switching over the response threshold.

DETAILED DESCRIPTION OF THE PREFERRED EMBODIMENTS

Figure 1:
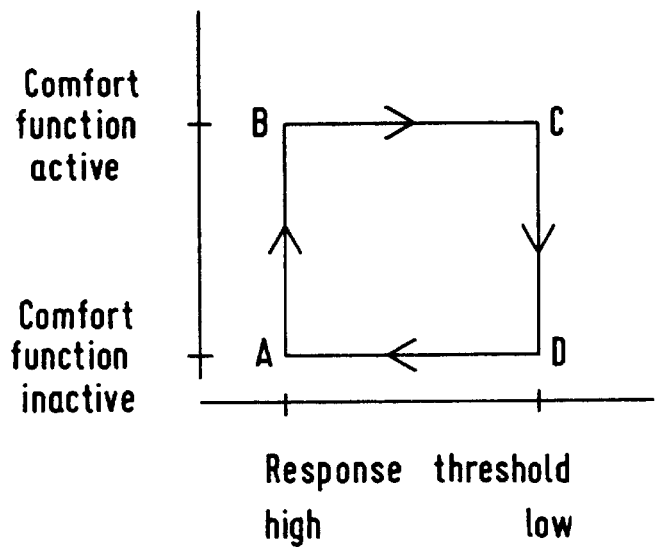
FIG. 1 is an illustration of the hysteresis of the response threshold of the receiver.

FIG. 1 illustrates the hysteresis of the response threshold of the receiver for a comfort function such as a closing of the windows or of the sunroof. In order to switch on the comfort function, it is necessary that the signals received by the receiver should lie above a first, relatively high threshold value. This is equivalent to a low sensitivity of the receiver, and to a reduced range of the transmitter. The system is inactive (status A, state of rest). If the signal coming from the transmitter is detected as correct with this increased response threshold, the comfort function is activated (status B). In addition, the response threshold is lowered (status C, sensitivity or range increased), so that the comfort function is carried out without disruption even if the signal level becomes smaller as a result of movement of the operator and the like. Not least for safety reasons, it is important that the comfort function remains activated only for as long as the operator has activated the transmitter, i.e. for as long as the corresponding pushbutton key is pressed. If the transmitter is deactivated (the pushbutton key is released), the comfort function remains in the position which has been reached, and is deactivated (status D). The response threshold is increased again (status A, initial status).

In contrast with the above, it is, of course, possible for the activation/deactivation of the comfort function and the switching over of the response threshold to be carried out simultaneously or in a varied sequence. For example, starting from the state of rest after the detection of a signal above the response threshold it is possible for the comfort function to be activated and the response threshold to be lowered simultaneously. Starting from the same state of rest it is also possible, after the detection of a signal above the response threshold, initially to lower the response threshold and then to activate the comfort function (reversal of the direction in FIG. 1).

Figure 2:
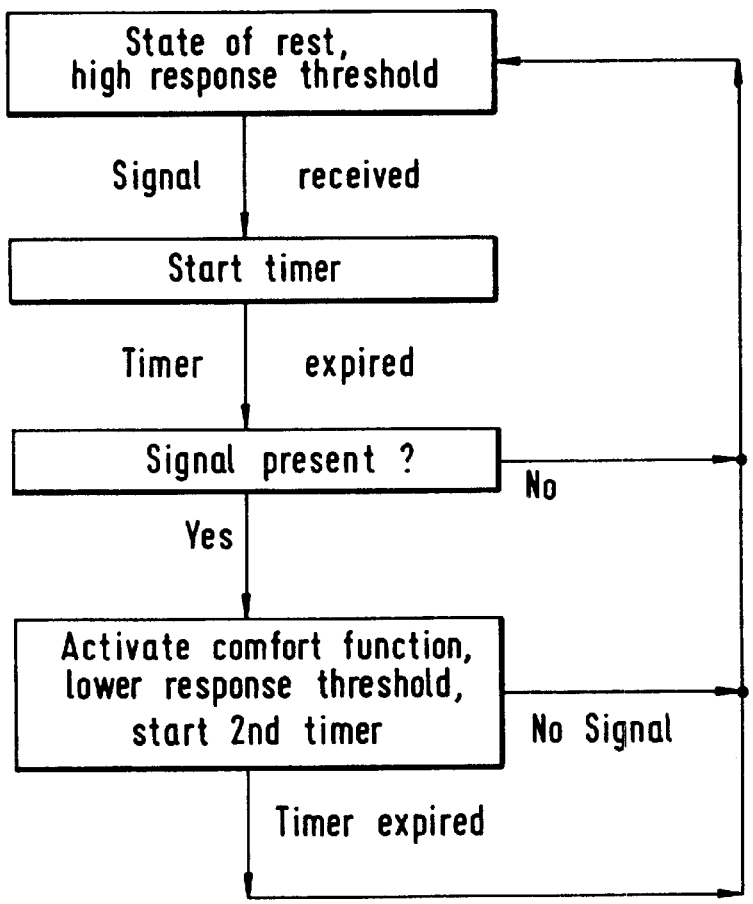
FIG. 2 is a flowchart of the control.

In a particular embodiment, the flowchart of which is illustrated in FIG. 2, it is provided that, after the detection of a signal above the response threshold of the receiver, firstly a timer is started. If the signal is still present after the timer has expired, the comfort function is activated and the response threshold of the receiver is changed as described. When the comfort function is activated, a timer can be started again, and after it has expired the comfort function is terminated, irrespective of whether the input signal continues to be present. The running time of this second timer is selected here to be sufficiently long that implementation of the comfort function can be concluded. However, the comfort function is always interrupted if there is no longer a signal present at the receiver.

FIG. 3 is a basic illustration of a complete remote control system for motor vehicles. It contains a transmitter 1, which is usually integrated into the key head. The transmitter 1 contains a power supply in the form of a battery, a code generator 3 and transmitter 4. In addition to the reception device 6, the receiver 5 contains a microprocessor 7. After a pushbutton key (not illustrated) has been activated, the transmitter 4 emits signals which are detected by the reception device 6 and passed on to the microprocessor 7. The signals are further processed in the microprocessor 7. As a function of the processing result, various actuators are actuated by the microprocessor, as appropriate. Further electronic components which may possibly be necessary in this context, such as amplifier stages, are part of the prior art and are familiar to the person skilled in the art.

An exemplary embodiment for the switching over, as provided according to the invention, of the response threshold of the receiver 5 is illustrated in FIG. 4. For this purpose, a switching over device 8 with an attenuator 9 is provided upstream of the reception device 6 and microprocessor 7. By means of a switch 10 which is actuated by the microprocessor 7, the attenuator 9 is switched between the antenna 11 and reception device 6 in the state of rest of the remote control system, and thus reduces the response threshold of the receiver 5.

Alternatively, it is also possible to change the response threshold by means of an amplifier connected between antenna 11 and reception device 6, instead of the attenuator 9. Then, only if the comfort function is in the active state is the amplifier connected into the circuit in order to reduce the response threshold. Instead of an amplifier or attenuator which can be connected into the circuit, an amplifier or an attenuator with a directly controllable gain or attenuation is also possible.

In a further embodiment, a comparator which compares the level of the input signal with a setpoint value is provided in the receiver. If the level of the input signal or of a signal which is derived therefrom lies above the setpoint value, the comfort function is activated and the response threshold is reduced by means of a lower setpoint value of the comparator. The comparator can be integrated either into the reception device 6 or into the microprocessor 7. However, a separate comparator between reception device 6 and microprocessor 7 is also possible. The respective setpoint value for the comparator is expediently specified by the microprocessor 7 as a function of the operating state of the receiver.

We claim:

1. A receiver of a remote control system, suitable for the closing system of a motor vehicle, is operative to receive signals of an associated transmitter, and is operative further to drive one or more actuators when signal levels above its response threshold are present, the receiver comprising means for determining if a signal level exceeds the response threshold, and means for automatically changing the response threshold of the receiver to a new threshold based on a value of the signal level, the new threshold level urging retention of a present state of activation of said one or more actuators.

2. The receiver as claimed in claim 1, wherein, the means for changing the response threshold comprises an attenuator or amplification element having a gain which is variable in response to a control signal.

3. The receiver as claimed in claim 1, further comprising a comparator for comparing a level of a received signal or of a signal derived therefrom with a setpoint value.

4. The receiver as claimed in claim 1, further comprising a timer, and wherein the changing means is operative for changing the response threshold after an elapsed interval of time following the detection of a received signal, the interval of time being established by the timer.

5. The receiver as claimed in claim 1, wherein the receiver is a radio receiver.

6. The receiver as claimed in claim 1, wherein the receiver is operative to activate not only a closing device for doors but also a closing device for windows and/or a sunroof.

7. The receiver as claimed in claim 1, further comprising a microprocessor, and the receiver is operative to supply an output signal for one or more actuators as long as a signal is detected above the response threshold.

8. A method for operating a remote control system, suitable for motor vehicles, the system comprising a transmitter and a receiver with response threshold which can be switched over, said method including the method steps of:
reducing the response threshold of the receiver after a signal of the transmitter is detected, and
increasing the response threshold of the receiver after a signal fails to be received; and
wherein the steps of reducing and increasing the threshold provide new values of threshold accomplished automatically based on a value of the signal, each of the new values of threshold urging retention of a present state of the control system.

9. The method as claimed in claim 8, wherein a reduction of the response threshold of the receiver takes place with a time delay after a detection of the signal.

* * * * *